United States Patent
Matsuda

(10) Patent No.: US 10,969,180 B2
(45) Date of Patent: Apr. 6, 2021

(54) AIR-CONDITIONING UNIT

(71) Applicant: DENSO CORPORATION, Kariya (JP)

(72) Inventor: Toshikazu Matsuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 116 days.

(21) Appl. No.: 16/261,920

(22) Filed: Jan. 30, 2019

(65) Prior Publication Data
US 2019/0162488 A1 May 30, 2019

Related U.S. Application Data

(63) Continuation of application No. PCT/JP2017/022191, filed on Jun. 15, 2017.

(30) Foreign Application Priority Data

Aug. 1, 2016 (JP) .............................. JP2016-151385

(51) Int. Cl.
*F28F 9/02* (2006.01)
*B60H 1/00* (2006.01)
(Continued)

(52) U.S. Cl.
CPC ....... *F28F 9/0224* (2013.01); *B60H 1/00335* (2013.01); *B60H 1/00521* (2013.01);
(Continued)

(58) Field of Classification Search
CPC ............ B60H 1/00335; B60H 1/00521; B60H 2001/006; F28D 1/0435; F28D 1/05366;
(Continued)

(56) References Cited

U.S. PATENT DOCUMENTS 4,328,859 A * 5/1982 Bouvot .................. F28F 9/001
165/149
5,219,017 A * 6/1993 Halstead ............. F28D 1/05366
165/173

(Continued)

FOREIGN PATENT DOCUMENTS

JP   2003220821 A   8/2003
JP   2004009813 A   1/2004
(Continued)

*Primary Examiner* — Eric S Ruppert
*Assistant Examiner* — Hans R Weiland
(74) *Attorney, Agent, or Firm* — Harness, Dickey & Pierce, P.L.C.

(57) ABSTRACT

An air-conditioning unit includes an air-conditioning case and a heat exchanger. The heat exchanger includes a plurality of tubes and a header tank. The air-conditioning case includes a holder in which the header tank is held while being inserted therein. The holder includes a first rib and a plurality of second ribs for pressing a tank outer wall of the header tank toward an internal space of the header tank. The first rib extends in a tube stacking direction. The plurality of second ribs are each connected to the first rib, are formed to extend from the first rib away from the tubes, and are arranged side by side at a predetermined inter-rib spacing in the tube stacking direction. The inter-rib spacing is larger than a length of the second ribs extending from the first rib away from the tubes in a tube longitudinal direction.

5 Claims, 5 Drawing Sheets

(51) Int. Cl.
   *F28F 9/00* (2006.01)
   *F28D 1/053* (2006.01)
   *F28D 1/04* (2006.01)

(52) U.S. Cl.
   CPC ..... *F28D 1/05366* (2013.01); *F28D 1/05391* (2013.01); *F28F 9/00* (2013.01); *F28F 9/001* (2013.01); *F28F 9/0202* (2013.01); *F28D 1/0435* (2013.01); *F28F 2225/08* (2013.01); *F28F 2265/28* (2013.01)

(58) Field of Classification Search
   CPC ......... F28D 1/05391; F28D 2021/0085; F28F 9/00; F28F 9/001; F28F 9/202; F28F 9/0224; F28F 2225/08; F28F 2265/28
   See application file for complete search history.

(56) References Cited

U.S. PATENT DOCUMENTS

| | | | | |
|---|---|---|---|---|
| 6,055,360 | A * | 4/2000 | Inoue | F28D 1/05366 165/151 |
| 7,841,384 | B2 * | 11/2010 | Vincent | B60H 1/00521 165/78 |
| 2003/0051497 | A1 * | 3/2003 | Nomura | F28F 9/002 62/239 |
| 2008/0296002 | A1 | 12/2008 | Nishino et al. | |
| 2011/0005719 | A1 * | 1/2011 | Seto | F28D 1/05366 165/61 |
| 2012/0132396 | A1 * | 5/2012 | Komatsubara | B60H 1/00521 165/67 |
| 2014/0096932 | A1 * | 4/2014 | Wolf | F28F 9/002 165/67 |
| 2015/0159961 | A1 * | 6/2015 | Berndt | F28F 1/00 165/173 |
| 2016/0010924 | A1 | 1/2016 | Samoto et al. | |
| 2018/0029441 | A1 * | 2/2018 | Nakanishi | B60H 1/00521 |
| 2018/0037085 | A1 * | 2/2018 | Nakado | B60H 1/00521 |
| 2018/0126822 | A1 * | 5/2018 | Nishino | F28D 1/05391 |

FOREIGN PATENT DOCUMENTS

| | | |
|---|---|---|
| JP | 2006335189 A | 12/2006 |
| JP | 2008298391 A | 12/2008 |
| JP | 2014055736 A | 3/2014 |
| JP | 2014163610 A | 9/2014 |
| JP | 2015189257 A | 11/2015 |

* cited by examiner

AIR-CONDITIONING UNIT

CROSS REFERENCE TO RELATED APPLICATIONS

The present application is a continuation application of International Patent Application No. PCT/JP2017/022191 filed on Jun. 15, 2017, which designated the United States and claims the benefit of priority from Japanese Patent Application No. 2016-151385 filed on Aug. 1, 2016. The entire disclosures of all of the above applications are incorporated herein by reference.

TECHNICAL FIELD

The present disclosure relates to an air-conditioning unit.

BACKGROUND

Conventionally, a heat exchanger of an air-conditioning unit has a heat exchanger core including first tubes, second tubes, first corrugated fins, second corrugated fins, and connectors.

SUMMARY

According to at least one embodiment of the present disclosure, an air-conditioning unit includes: an air-conditioning case in which an air passage is formed, the air passage allowing air to flow through the air passage; and a heat exchanger disposed in the air passage and configured to perform heat exchange between a refrigerant and the air flowing through the air passage. The heat exchanger includes a plurality of tubes stacked in a tube stacking direction, extending in a tube longitudinal direction, and allowing the refrigerant to flow through the tubes, and a header tank formed to extend in the tube stacking direction and connected to one end of each of the plurality of tubes. The header tank includes a tank outer wall that separates an internal space of the header tank from the outside of the header tank and extends in the tube stacking direction. The air-conditioning case includes a holder in which the header tank is held while being inserted in the holder. The holder includes a first rib and a plurality of second ribs, the first and second ribs pressing the tank outer wall toward the internal space. The first rib extends in the tube stacking direction. The plurality of second ribs are each connected to the first rib, are formed to extend from the first rib away from the tubes, and are arranged side by side at a predetermined inter-rib spacing in the tube stacking direction. The inter-rib spacing is larger than a length of the second ribs extending from the first rib away from the tubes in the tube longitudinal direction.

DETAILED DESCRIPTION

Figure 1:
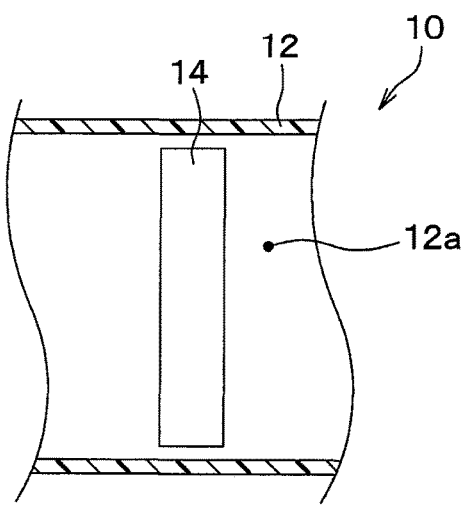
FIG. 1 is a schematic diagram illustrating a cross section of a part of an air-conditioning unit of at least one embodiment and a schematic configuration of the air-conditioning unit.

Embodiments of the present disclosure will now be described with reference to the drawings. Parts that are identical or equivalent to each other in the following embodiments including other embodiments described below are assigned the same reference numerals in the drawings.

First Embodiment

An air-conditioning unit 10 of the present embodiment is a vehicle air-conditioning unit mounted in a vehicle. As illustrated in FIG. 1, the air-conditioning unit 10 includes an air-conditioning case 12 forming an outer shell of the air-conditioning unit 10, an evaporator 14, a heater core (not shown) which is a heater, a blower (not shown), and the like.

The air-conditioning case 12 accommodates, for example, the evaporator 14 and the heater core inside the air-conditioning case 12. An air passage 12a through which the air flows to be blown into a passenger compartment is formed inside the air-conditioning case 12, and the evaporator 14 and the heater core are disposed in the air passage 12a.

The evaporator 14 forms a part of a refrigeration cycle in which a refrigerant is circulated, the refrigeration cycle including a compressor, a radiator, and a decompressor. The evaporator 14 is a heat exchanger allowing heat exchange between the refrigerant and the air flowing through the air passage 12a, and the refrigerant decompressed by the decompressor flows into the evaporator 14. The evaporator 14 evaporates the refrigerant and cools the air by the heat exchange between the refrigerant and the air flowing through the air passage 12a.

Figure 2:
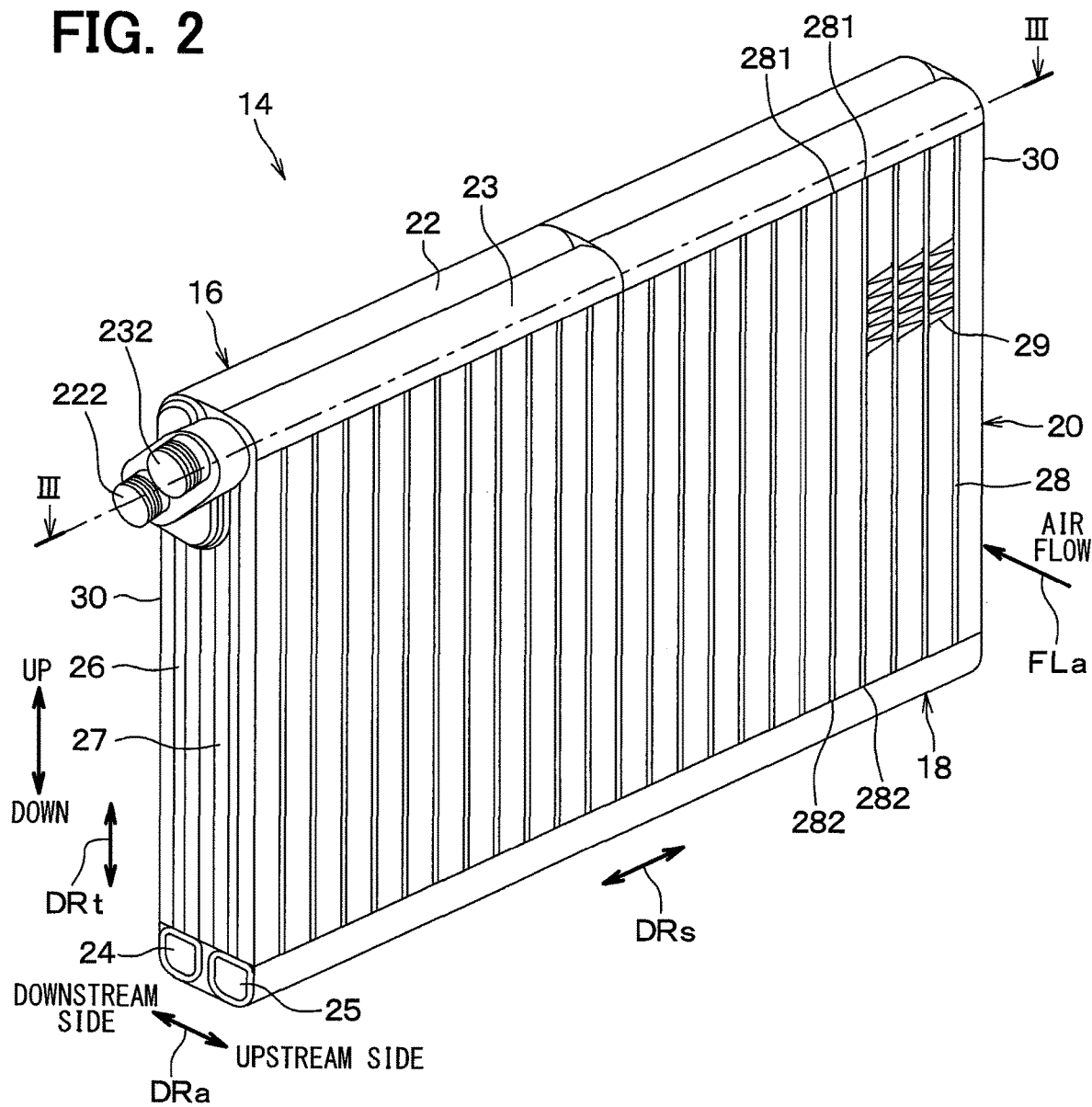
FIG. 2 is a perspective view illustrating an evaporator alone according to at least one embodiment.

As illustrated in FIG. 2, the evaporator 14 of the present embodiment basically has a structure similar to that of an evaporator illustrated in JP 2014-55736 A, for example. That is, the evaporator 14 of the present embodiment includes a first header tank 16 and a second header tank 18 disposed at intervals in the vertical direction, and a core 20 provided between the header tanks 16 and 18. An arrow FLa in FIG. 2 indicates the direction of an air flow (that is, a blown air flow) passing through the core 20 of the evaporator 14.

Figure 3:
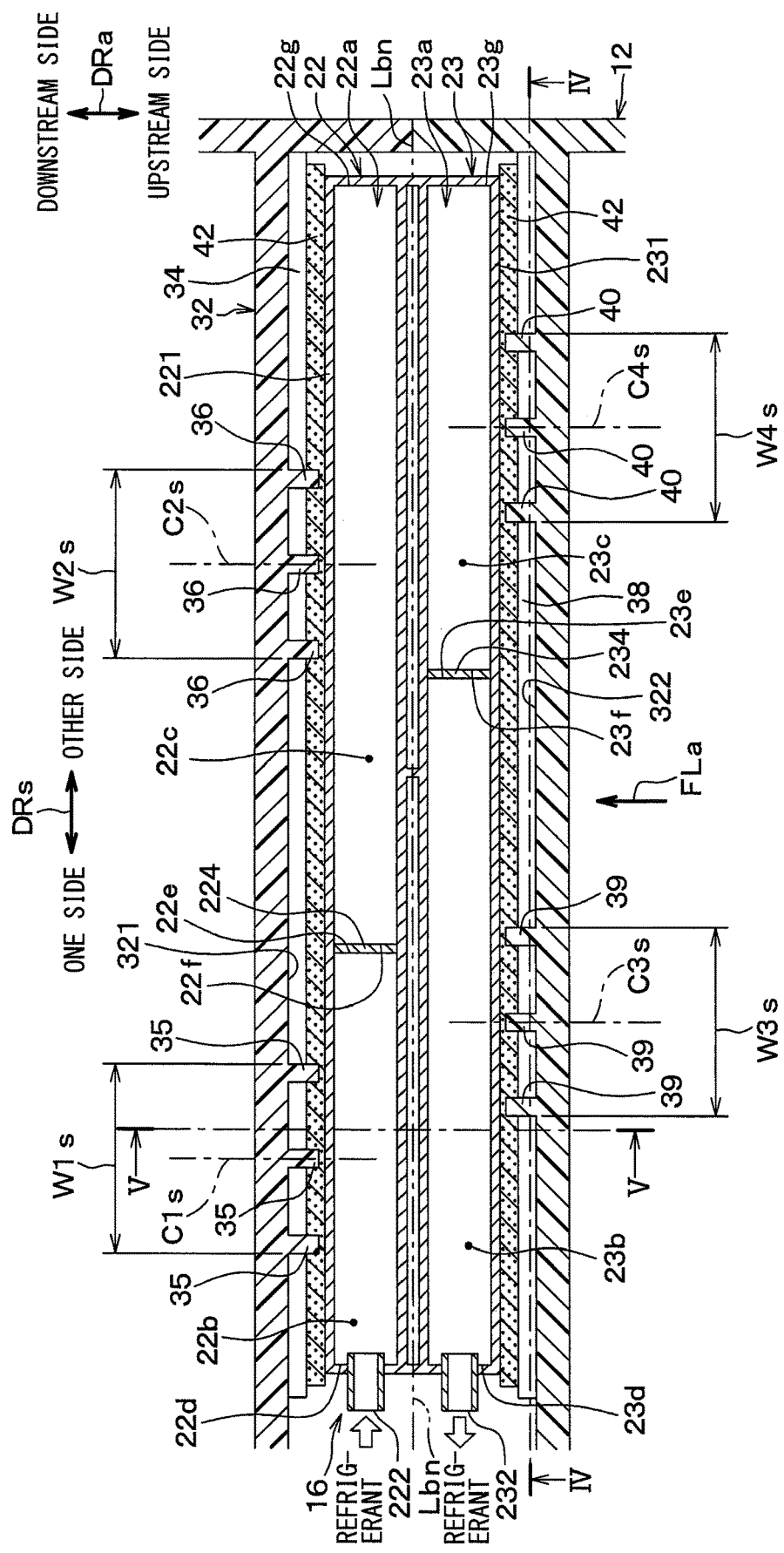
FIG. 3 is a cross-sectional view taken along line III-III of FIG. 2 and illustrating a first header tank as viewed from above.

The first header tank 16 is disposed on the upper side with respect to the second header tank 18. As illustrated in FIG. 3, the first header tank 16 includes a first leeward header 22 and a first windward header 23 that are integrated with each other. The first leeward header 22 is located downstream of the first windward header 23 along an air flow direction DRa. The air flow direction DRa is an arranged direction of an air inflow surface of the core 20 located on the upstream side of the air flow and an air outflow surface of the core located on the downstream side of the air flow.

The second header tank 18 illustrated in FIG. 2 has a structure similar to that of the first header tank 16 described above. Specifically, the second header tank 18 includes a second leeward header 24 and a second windward header 25 that are integrated with each other. The second leeward header 24 is located downstream of the second windward header 25 along the air flow direction DRa.

Figure 4:
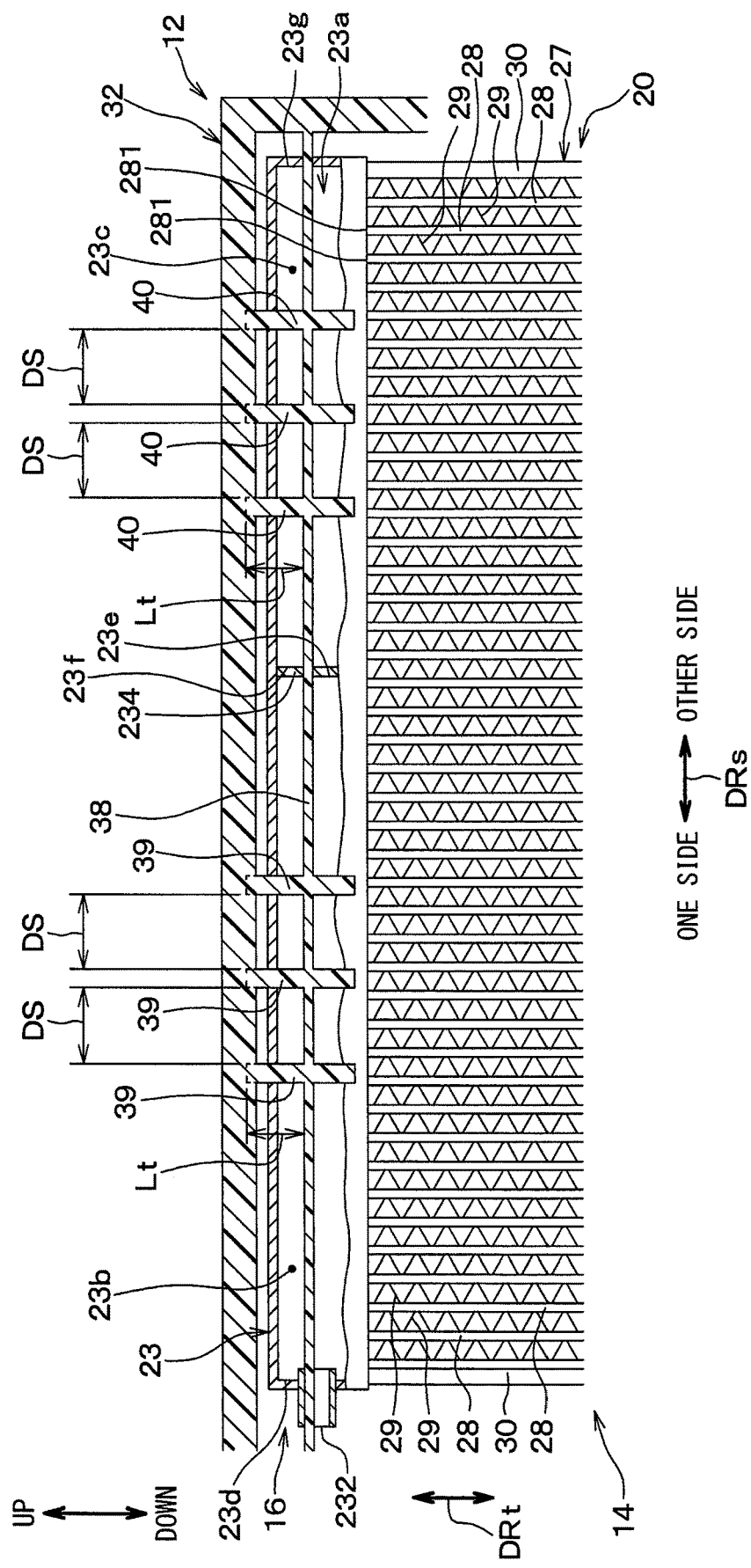
FIG. 4 is a cross-sectional view taken along line IV-IV of FIG. 3 and illustrating a part of the first header tank without illustration of a packing material.

The core 20 includes a leeward tube row 26 and a windward tube row 27. The leeward tube row 26 is located downstream of the windward tube row 27 along the air flow direction DRa. As illustrated in FIGS. 2 and 4, the leeward tube row 26 and the windward tube row 27 each have a plurality of tubes 28 through which a refrigerant flows and a plurality of corrugated fins 29. FIG. 4 is a cross-sectional view taken along line IV-IV of FIG. 3 and also a cross-sectional view taken along line IV-IV of FIG. 5. FIG. 4 omits illustration of a packing material 42 described later in order to facilitate illustration.

In each of the tube rows 26 and 27, the tubes 28 are stacked in a tube stacking direction DRs and extend in a tube longitudinal direction DRt. The tubes 28 each have a flat cross section with the direction of thickness corresponding to the tube stacking direction DRs. The tubes 28 are made of aluminum, for example, and can be obtained by extrusion or the like.

The corrugated fins 29 are each disposed between the tubes 28 in each of the tube rows 26 and 27, and are brazed to the tubes 28. Note that the tube stacking direction DRs, the tube longitudinal direction DRt, and the air flow direction DRa are directions intersecting one another, strictly speaking, directions orthogonal to one another. The tube longitudinal direction DRt corresponds with the vertical direction in the present embodiment, but need not correspond with the vertical direction and may be tilted with respect to the vertical direction, for example.

Side plates 30 are disposed at both ends of each of the tube rows 26 and 27 in the tube stacking direction DRs. The side plate 30 is brazed to the corrugated fin 29 disposed between the side plate 30 and the tube 28 adjacent thereto.

Each of the header tanks 16 and 18 is formed to extend in the tube stacking direction DRs. Accordingly, each of the headers 22, 23, 24, and 25 is also formed to extend in the tube stacking direction DRs.

The first header tank 16 is connected to one end 281 as an upper end of each of the tubes 28. At the same time, the second header tank 18 is connected to the other end 282 as a lower end of each of the tubes 28.

Specifically, as illustrated in FIGS. 2 to 4, the one end 281 of each of the tubes 28 in the leeward tube row 26 is connected to the first leeward header 22 of the first header tank 16. As a result, the tubes 28 in the leeward tube row 26 communicate with an internal space 22a of the first leeward header 22. The one end 281 of each of the tubes 28 in the windward tube row 27 is connected to the first windward header 23. As a result, the tubes 28 in the windward tube row 27 communicate with an internal space 23a of the first windward header 23.

The other end 282 of each of the tubes 28 in the leeward tube row 26 is connected to the second leeward header 24 of the second header tank 18. As a result, the tubes 28 in the leeward tube row 26 communicate with an internal space of the second leeward header 24. The other end 282 of each of the tubes 28 in the windward tube row 27 is connected to the second windward header 25. As a result, the tubes 28 in the windward tube row 27 communicate with an internal space of the second windward header 25.

Moreover, the headers 22 and 23 of the first header tank 16 have tank outer walls 221 and 231, respectively. The tank outer wall 221 of the first leeward header 22 is formed to extend in the tube stacking direction DRs and separates the outside of the first header tank 16 from the internal space 22a of the first leeward header 22.

Likewise, the tank outer wall 231 of the first windward header 23 is formed to extend in the tube stacking direction DRs and separates the outside of the first header tank 16 from the internal space 23a of the first windward header 23. The tank outer walls 221 and 231 form the outer shell of the first header tank 16 as a whole.

The first header tank 16 has two partition plates 224 and 234, that is, a leeward partition plate 224 and a windward partition plate 234. The two partition plates 224 and 234 partition the internal spaces 22a and 23a of the first header tank 16 in the tube stacking direction DRs, respectively.

Specifically, the first leeward header 22 has the leeward partition plate 224, which partitions the internal space 22a of the first leeward header 22 in the tube stacking direction DRs to form a plurality of separated spaces 22b and 22c. The plurality of separated spaces 22b and 22c in the first leeward header 22 is specifically one separated space 22b and the other separated space 22c disposed on the other side of the tube stacking direction DRs with respect to the one separated space 22b.

The first windward header 23 has the windward partition plate 234, which partitions the internal space 23a of the first windward header 23 in the tube stacking direction DRs to form a plurality of separated spaces 23b and 23c. The plurality of separated spaces 23b and 23c in the first windward header 23 is specifically one separated space 23b and the other separated space 23c disposed on the other side of the tube stacking direction DRs with respect to the one separated space 23b.

The separated spaces 22b, 22c, 23b, and 23c formed in the above manner each communicate with at least any of all the tubes 28 included in the evaporator 14, and are each formed as a tank space which is a space extending in the tube stacking direction DRs. That is, the tank space is a continuous space not divided by a partition wall such as the partition plates 224 and 234.

Focusing on the one separated space 22b, for example, the one separated space 22b is the tank space formed separately from the other separated spaces 22c, 23b, and 23c. Moreover, focusing on one of the four tank spaces 22b, 22c, 23b, and 23c, the one tank space is provided as one space among the plurality of separated spaces 22b, 22c, 23b, and 23c.

The first leeward header 22 has a refrigerant inlet 222 for allowing a refrigerant to flow into the first header tank 16 from the outside of the evaporator 14. The refrigerant inlet 222 communicates with the one separated space 22b in the first leeward header 22, so that the refrigerant from the outside of the evaporator 14 first flows into the one separated space 22b.

The first windward header 23 has a refrigerant outlet 232 for allowing the refrigerant in the first header tank 16 to flow to the outside of the evaporator 14. The refrigerant outlet 232 communicates with the one separated space 23b in the first windward header 23, so that the refrigerant flows from the inside of the one separated space 23b to the outside of the evaporator 14 via the refrigerant outlet 232. The refrigerant inlet 222 and the refrigerant outlet 232 are both provided at one end of the first header tank 16 in the tube stacking direction DRs.

The second header tank 18 also has a structure similar to that of the first header tank 16 described above. That is, the second header tank 18 also has tank outer walls and partition plates, and the internal space of each of the headers 24 and 25 of the second header tank 18 is separated into a plurality of separated spaces. However, the second header tank 18 does not have the refrigerant inlet 222 and the refrigerant outlet 232.

In the evaporator 14 configured as described above, the plurality of tubes 28 of the evaporator 14 is divided into a group of tubes through which the refrigerant flows from the side of the first header tank 16 toward the second header tank 18, and a group of tubes through which the refrigerant flows from the side of the second header tank 18 toward the first header tank 16. The refrigerant flowing into the one separated space 22b in the first leeward header 22 from the refrigerant inlet 222 flows through the plurality of tubes 28 and through the plurality of separated spaces in the first header tank 16 and the second header tank 18. The refrigerant flowing through the evaporator 14 eventually flows into the one separated space 23b in the first windward header 23. The refrigerant flowing into the one separated space 23b in the first windward header 23 flows to the outside of the evaporator 14 from the inside of the one separated space 23b through the refrigerant outlet 232.

Figure 5:
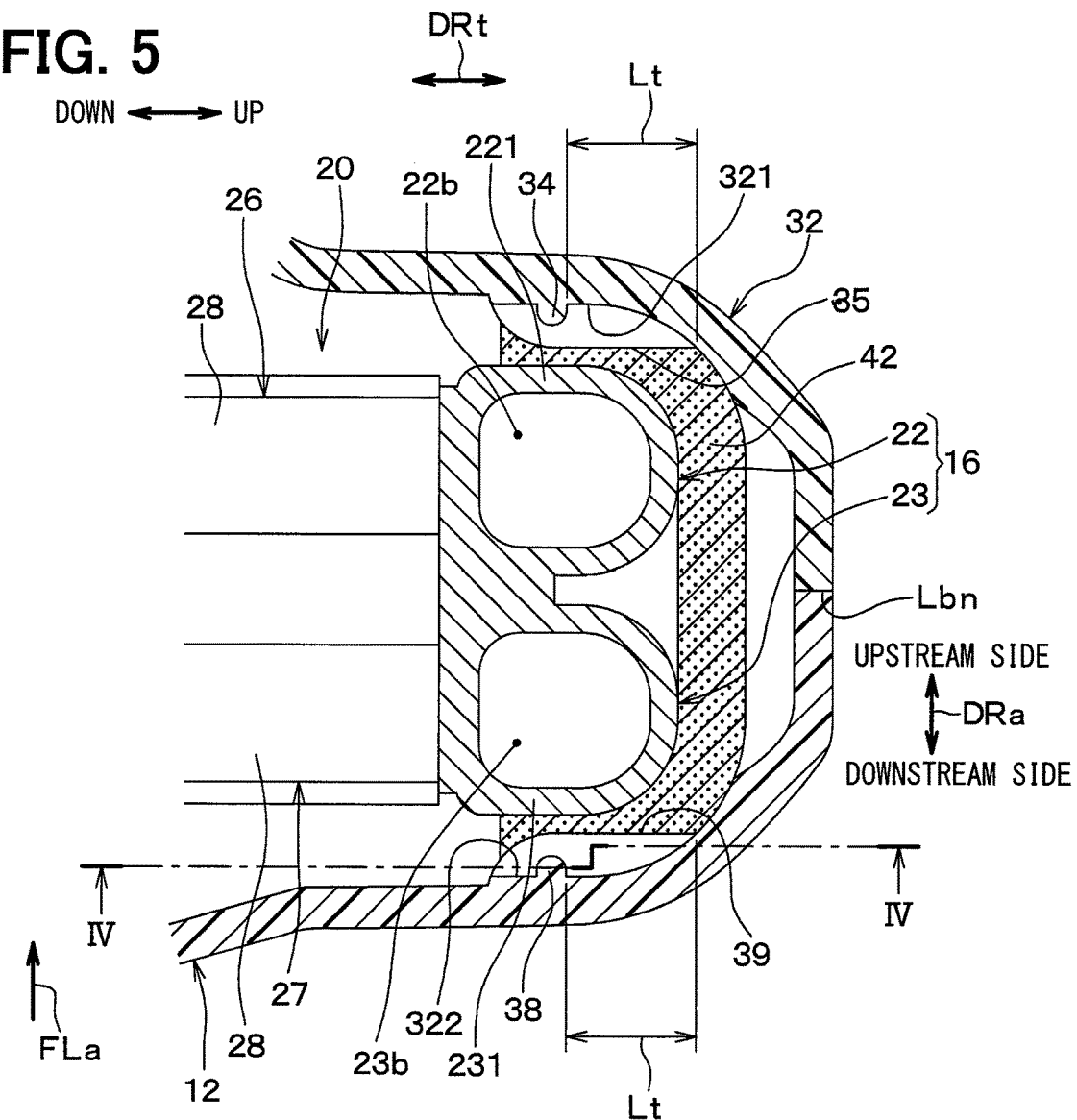
FIG. 5 is a cross-sectional view taken along line V-V of FIG. 3.

As illustrated in FIGS. 3 to 5, the evaporator 14 provided in the air passage 12a of the air-conditioning case 12 is fixed to the air-conditioning case 12. The air-conditioning case 12 thus has a holder by which the header tanks 16 and 18 are held while being inserted therein. While FIGS. 3 to 5 illustrate a holder 32 by which the first header tank 16 is held while being inserted therein, that is, the holder 32 for the first header tank 16, a holder for the second header tank 18 is similar to that of FIGS. 3 to 5. Thus, the holder 32 for the first header tank 16 will be described below, and the description of the holder for the second header tank 18 will be omitted.

The holder 32 illustrated in FIGS. 3 to 5 is open to the side of the air passage 12a and is recessed such that the first header tank 16 can be fitted therein. The first header tank 16 extends in the tube stacking direction DRs, and thus the holder 32 also extends in the tube stacking direction DRs.

The holder 32 has a pair of first ribs 34 and 38 and a plurality of second ribs 35, 36, 39, and 40 for clamping and holding the first header tank 16. The first ribs 34 and 38 and the second ribs 35, 36, 39, and 40 all protrude inward from side wall surfaces 321 and 322 of the holder 32 to press the tank outer walls 221 and 231 toward the internal spaces 22a and 23a. The side wall surfaces 321 and 322 of the holder 32 form a pair to be oriented in a direction parallel to the air flow direction DRa and face each other across the first header tank 16.

The air-conditioning case 12 is assembled such that the holder 32 clamps the first header tank 16, whereby the holder 32 has a case member boundary Lbn which is a boundary between a plurality of case members forming the air-conditioning case 12. The case member boundary Lbn is formed to extend in the tube stacking direction DRs inside the holder 32. Then, one case member and the other case member bounded by the case member boundary Lbn are snap fitted or bolted to be fixed to each other so that the first header tank 16 is held by the holder 32. FIG. 3 indicates the case member boundary Lbn using a two-dot chain line.

The packing material 42 made of an elastic material such as urethane foam is provided between the holder 32 and the first header tank 16. Accordingly, the first ribs 34 and 38 and the second ribs 35, 36, 39, and 40 all press the tank outer walls 221 and 231 through the packing material 42.

Specifically, between the pair of first ribs 34 and 38, the leeward first rib 34 provided on the downstream side in the air flow direction DRa extends in the tube stacking direction DRs over the entire length of the first leeward header 22 to press the tank outer wall 221 of the first leeward header 22. Between the pair of first ribs 34 and 38, the windward first rib 38 provided on the upstream side in the air flow direction DRa extends in the tube stacking direction DRs over the entire length of the first windward header 23 to press the tank outer wall 231 of the first windward header 23. In short, the pair of first ribs 34 and 38 extends in the tube stacking direction DRs over the entire length of the first header tank 16.

The second ribs 35, 36, 39, and 40 of the holder 32 are divided into four second rib groups depending on the site of placement of the ribs. The second rib 35 belonging to a second rib group that is placed on one side in the tube stacking direction DRs and on the downstream side in the air flow direction DRa is referred to as one leeward second rib 35. The second rib 36 belonging to a second rib group that is placed on the other side in the tube stacking direction DRs and on the downstream side in the air flow direction DRa is referred to as the other leeward second rib 36. The second rib 39 belonging to a second rib group that is placed on the one side in the tube stacking direction DRs and on the upstream side in the air flow direction DRa is referred to as one windward second rib 39. The second rib 40 belonging to a second rib group that is placed on the other side in the tube stacking direction DRs and on the upstream side in the air flow direction DRa is referred to as the other windward second rib 40. In the present embodiment, the number of second ribs belonging to each second rib group is three.

The one leeward second rib 35 and the other leeward second rib 36 are each connected to the leeward first rib 34 and intersect with the leeward first rib 34. That is, the second ribs 35 and 36 are formed to extend from the leeward first rib 34 to the side of the tubes 28 and to the side opposite to the tubes 28 in the tube longitudinal direction DRt.

The plurality of one leeward second ribs 35 is provided between one end 22d and the other end 22e of the one separated space 22b in the first leeward header 22 in the tube stacking direction DRs. The one leeward second ribs 35 therefore press a portion of the tank outer wall 221 covering the one separated space 22b. The plurality of one leeward second ribs 35 is arranged side by side at a predetermined inter-rib spacing DS in the tube stacking direction DRs.

Moreover, the plurality of one leeward second ribs 35 is arranged such that a rib arrangement range W1s of the one leeward second ribs 35 overlaps a center position C1s of the one separated space 22b in the first leeward header 22 in the tube stacking direction DRs. Specifically, the rib arrangement range W1s of the one leeward second ribs 35 is the range (that is, the width) occupied by the plurality of one leeward second ribs 35 in the tube stacking direction DRs. The rib arrangement range W1s of the one leeward second ribs 35 overlapping the center position C1s of the one separated space 22b in the first leeward header 22 means, in other words, that the center position C1s falls within the rib arrangement range W1s in the tube stacking direction DRs.

The plurality of other leeward second ribs 36 is provided between one end 22f and the other end 22g of the other separated space 22c in the first leeward header 22 in the tube stacking direction DRs. The other leeward second ribs 36 therefore press a portion of the tank outer wall 221 covering the other separated space 22c. The plurality of other leeward second ribs 36 is arranged side by side at the predetermined inter-rib spacing DS in the tube stacking direction DRs.

Moreover, the plurality of other leeward second ribs 36 is arranged such that a rib arrangement range W2s of the other leeward second ribs 36 overlaps a center position C2s of the other separated space 22c in the first leeward header 22 in the tube stacking direction DRs. Specifically, the rib arrangement range W2s of the other leeward second ribs 36 is the range occupied by the plurality of other leeward second ribs 36 in the tube stacking direction DRs.

The windward first rib 38, the one windward second rib 39, and the other windward second rib 40 are similar to the leeward first rib 34, the one leeward second rib 35, and the other leeward second rib 36 described above, respectively. Specifically, the one windward second rib 39 and the other windward second rib 40 are each connected to the windward first rib 38 and intersect with the windward first rib 38. That is, the second ribs 39 and 40 are formed to extend from the windward first rib 38 to the side of the tubes 28 and to the side opposite to the tubes 28 in the tube longitudinal direction DRt.

The plurality of one windward second ribs 39 is provided between one end 23d and the other end 23e of the one separated space 23b in the first windward header 23 in the tube stacking direction DRs. The one windward second ribs 39 therefore press a portion of the tank outer wall 231 covering the one separated space 23b. The plurality of one windward second ribs 39 is arranged side by side at the predetermined inter-rib spacing DS in the tube stacking direction DRs.

Moreover, the plurality of one windward second ribs 39 is arranged such that a rib arrangement range W3s of the one windward second ribs 39 overlaps a center position C3s of the one separated space 23b in the first windward header 23 in the tube stacking direction DRs. Specifically, the rib arrangement range W3s of the one windward second ribs 39 is the range occupied by the plurality of one windward second ribs 39 in the tube stacking direction DRs.

The plurality of other windward second ribs 40 is provided between one end 23f and the other end 23g of the other separated space 23c in the first windward header 23 in the tube stacking direction DRs. The other windward second ribs 40 therefore press a portion of the tank outer wall 231 covering the other separated space 23c. The plurality of other windward second ribs 40 is arranged side by side at the predetermined inter-rib spacing DS in the tube stacking direction DRs. The inter-rib spacings DS of the second ribs 35, 36, 39, and 40 are equal to one another in the present embodiment but may be different from one another.

Moreover, the plurality of other windward second ribs 40 is arranged such that a rib arrangement range W4s of the other windward second ribs 40 overlaps a center position C4s of the other separated space 23c in the first windward header 23 in the tube stacking direction DRs. Specifically, the rib arrangement range W4s of the other windward second ribs 40 is the range occupied by the plurality of other windward second ribs 40 in the tube stacking direction DRs.

As illustrated in FIGS. 4 and 5, the inter-rib spacing DS of the one leeward second ribs 35 is larger than a length Lt (that is, an extension length Lt) that each of the one leeward second ribs 35 extends from the leeward first rib 34 to the side opposite to the tubes 28 in the tube longitudinal direction DRt. When the individual inter-rib spacings DS are different from one another, the inter-rib spacing DS to be compared with the extension length Lt may be an average value of the individual inter-rib spacings DS, for example. Likewise, when the individual extension lengths Lt are different from one another, the extension length Lt to be compared with the inter-rib spacing DS may be an average value of the individual extension lengths Lt, for example.

The relationship that the inter-rib spacing DS is larger than the extension length Lt also applies to the other second ribs 36, 39, and 40. The extension lengths Lt of the second ribs 35, 36, 39, and 40 may be equal to or different from one another.

As illustrated in FIGS. 3 and 5, the one leeward second ribs 35 and the other leeward second ribs 36 protrude more than the leeward first rib 34 in the air flow direction DRa. In other words, the second ribs 35 and 36 protrude to be closer to the first leeward header 22 than the leeward first rib 34 in the air flow direction DRa. The second ribs 35 and 36 thus press the tank outer wall 221 of the first leeward header 22 stronger than the first rib 34.

Likewise, the one windward second ribs 39 and the other windward second ribs 40 protrude more than the windward first rib 38 in the air flow direction DRa. In other words, the second ribs 39 and 40 protrude to be closer to the first windward header 23 than the windward first rib 38 in the air flow direction DRa. The second ribs 39 and 40 thus press the tank outer wall 231 of the first windward header 23 stronger than the first rib 38.

As described above, according to the present embodiment, the first ribs 34 and 38 and the second ribs 35, 36, 39, and 40 press the tank outer walls 221 and 231 toward the internal spaces 22a and 23a. The second ribs 35, 36, 39, and 40 are arranged side by side at the predetermined inter-rib spacings DS in the tube stacking direction DRs. Moreover, the inter-rib spacing DS of each of the second ribs 35, 36, 39, and 40 is larger than the extension length Lt of each of the second ribs 35, 36, 39, and 40.

Therefore, in terms of suppressing vibration of the first header tank 16, the amplitude of vibration of the tank outer walls 221 and 231 when the first header tank 16 vibrates is properly suppressed by the ribs 34 to 36 and 38 to 40, whereby the vibration of the first header tank 16 can be efficiently suppressed. As a result, the refrigerant flow noise generated from the evaporator 14 can be reduced.

In the present embodiment, the inter-rib spacing DS is larger than the extension length Lt. Accordingly, the range of the tank outer walls 221 and 231 pressed by the second ribs 35, 36, 39, and 40 can be expanded in the tube stacking direction DRs while the tank outer walls 221 and 231 are pressed by the ribs 34 to 36 and 38 to 40 with the pressing force which is not excessive. As a result, the refrigerant flow noise can be reduced for heat exchangers of various sizes. Such effect is similarly obtained for the second header tank 18.

Considering the cause of the refrigerant flow noise generated in the evaporator 14, one cause can be the vibration of the header tanks 16 and 18 due to collision energy of the refrigerant flowing into the header tanks 16 and 18. When the header tanks 16 and 18 vibrate, the vibration is transmitted to the tubes 28 to generate a radiated sound from the entire core 20. That is, suppressing the vibration of the header tanks 16 and 18 reduces the vibration transmitted to the tubes 28 and thus the radiated sound from the evaporator 14.

The vibration of the first header tank 16 tends to be particularly large at the center of each of the separated spaces 22b, 22c, 23b, and 23c, for example. Thus, the effect of suppressing the vibration of the first header tank 16 is easily obtained in principle by pressing and holding the tank outer walls 221 and 231 at the centers. However, header tanks of heat exchangers as evaporators or the like can typically be of various sizes, and a conventional technique in some cases cannot sufficiently obtain the effect of suppressing the vibration of the header tank depending on the size of the header tank.

On the other hand, the present embodiment specifies the relationship between the inter-rib spacing DS and the extension length Lt of the second ribs in the holder 32 as described above, thereby being able to reduce the refrigerant flow noise (such as a radiated sound of 2 kHz to 10 kHz) for heat exchangers of various sizes.

Figure 6:
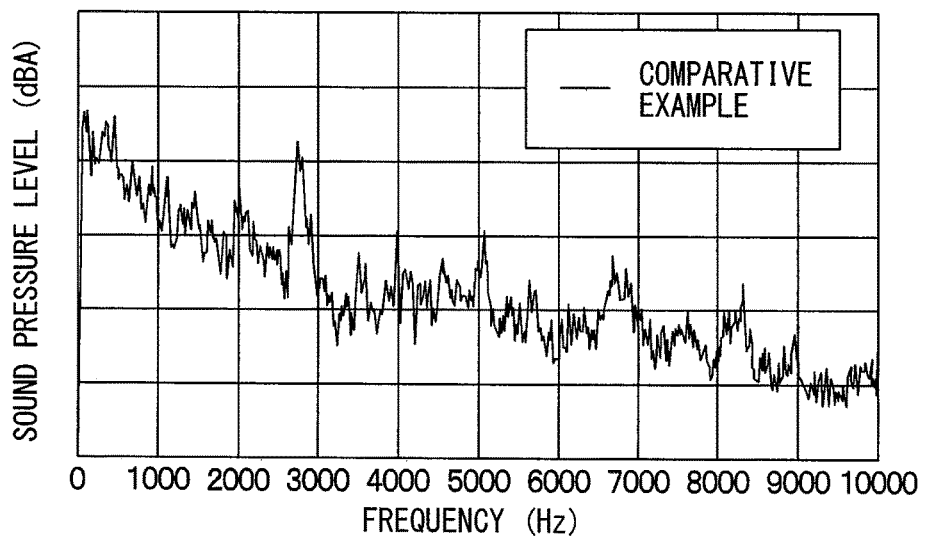
FIG. 6 is a graph illustrating a result of an experiment in which an evaporator of a comparative example compared with at least one embodiment is operated under predetermined operating conditions, and is a graph illustrating a relationship between the frequency of a radiated sound from the evaporator and a sound pressure level thereof.
Figure 7:
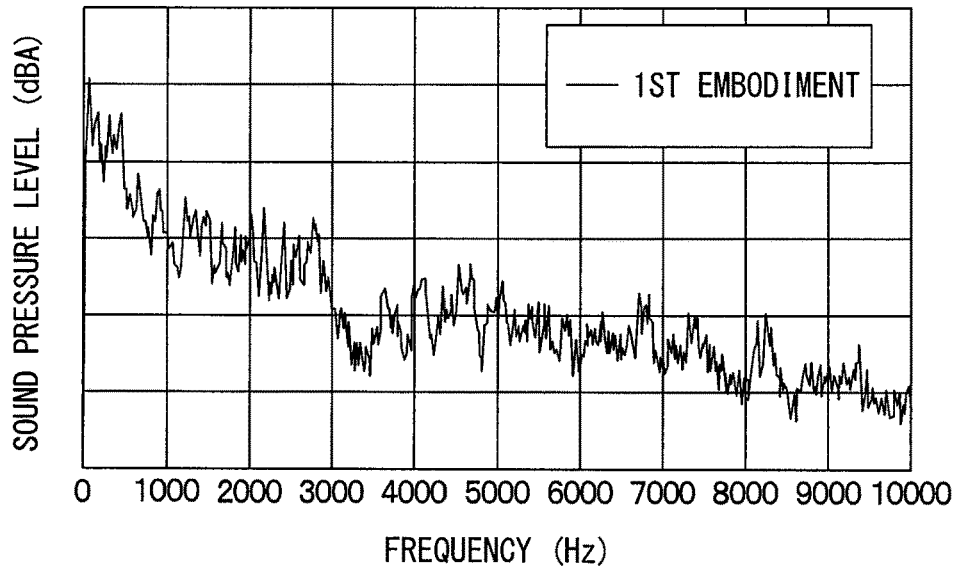
FIG. 7 is a graph illustrating a result of an experiment in which the evaporator of at least one embodiment is operated under the above operating conditions, and is a graph illustrating a relationship between the frequency of a radiated sound from the evaporator and a sound pressure level thereof.
Figure 8:
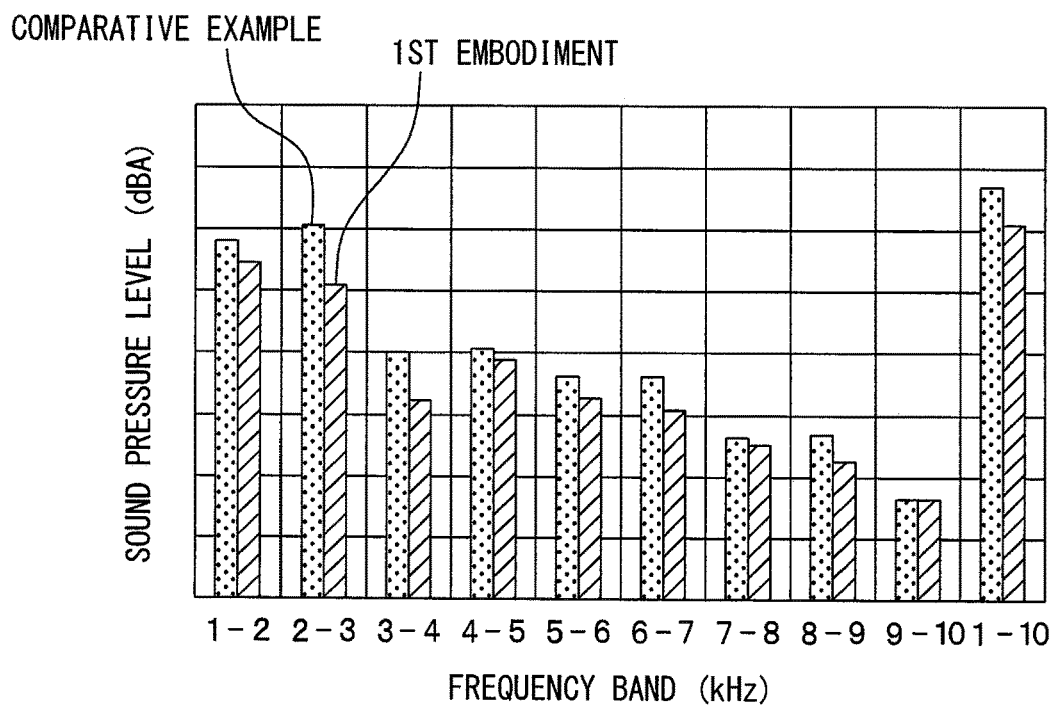
FIG. 8 is a graph displaying a partial overall value of each frequency band obtained from the experimental results in FIGS. 6 and 7.

Next, a result of an experiment performed in each of a comparative example to be compared with the present embodiment and the present embodiment will be described. FIGS. 6 to 8 illustrate experimental results obtained when an evaporator of the comparative example to be compared with the present embodiment and the evaporator 14 of the present embodiment are operated under common operating conditions. Contrary to the evaporator 14 of the present embodiment, in the evaporator of the comparative example, the inter-rib spacing DS of the second ribs in the holder 32 is smaller than the extension length Lt of each of the second ribs. The evaporator of the comparative example is otherwise similar to the evaporator 14 of the present embodiment.

For the evaporator of the comparative example, the relationship between the frequency and the sound pressure level illustrated in FIG. 6 is obtained from the experiment. For the evaporator 14 of the present embodiment, the relationship between the frequency and the sound pressure level illustrated in FIG. 7 is obtained from the experiment. FIG. 8 is a graph displaying a partial overall value of each frequency band obtained from the experimental results in FIGS. 6 and 7. As can be seen from FIG. 8, the evaporator 14 of the present embodiment has a low sound pressure level in every frequency band as compared to the evaporator of the comparative example, whereby the refrigerant flow noise is reduced. FIGS. 6 and 7 have the same scale on the vertical axes indicating the sound pressure level.

Moreover, according to the present embodiment, as illustrated in FIGS. 3 and 4, the plurality of one leeward second ribs 35 is provided between the one end 22d and the other end 22e of the one separated space 22b in the first leeward header 22 in the tube stacking direction DRs. At the same time, the plurality of one leeward second ribs 35 is arranged such that the rib arrangement range W1s of the one leeward second ribs 35 overlaps the center position C1s of the one separated space 22b in the first leeward header 22 in the tube stacking direction DRs. The plurality of one leeward second ribs 35 presses a portion of the tank outer wall 221 covering the one separated space 22b. This also applies to the other second ribs 36, 39, and 40. The vibration of the tank outer walls 221 and 231 can thus be suppressed by pressing the tank outer walls 221 and 231 at the site prone to vibration. Such effect is similarly obtained for the second header tank 18.

According to the present embodiment, the first header tank 16 has the two partition plates 224 and 234 as illustrated in FIGS. 3 and 4. The two partition plates 224 and 234 partition the corresponding internal spaces 22a and 23a of the first header tank 16 in the tube stacking direction DRs to form the plurality of separated spaces 22b, 22c, 23b, and 23c. Each of the plurality of separated spaces 22b, 22c, 23b, and 23c is formed as the tank space. Accordingly, even when the internal spaces 22a and 23a of the first header tank 16 are divided into the plurality of separated spaces 22b, 22c, 23b, and 23c, the refrigerant flow noise of the evaporator 14 can be reduced by efficiently suppressing the vibration of the first header tank 16. Such effect is similarly obtained for the second header tank 18.

Other Embodiments (1) In the above embodiment, as illustrated in FIG. 3, the first header tank 16 has the partition plates 224 and 234 but may not have the partition plates 224 and 234. Without the partition plates 224 and 234, the internal spaces 22a and 23a of the headers 22 and 23 are not divided. In that case, the internal space 22a of the first leeward header 22 is formed as one tank space, and the internal space 23a of the first windward header 23 is also formed as one tank space. The similar applies to the second header tank 18.

(2) In the above embodiment, as illustrated in FIG. 3, the first header tank 16 has the two headers 22 and 23 but may only have one header. The similar applies to the second header tank 18.

(3) In the above embodiment, the heat exchanger held by the holder 32 of the air-conditioning case 12 is the evaporator 14, but may be something other than the evaporator such as a condenser.

(4) In the above embodiment, as illustrated in FIGS. 3 and 5, the holder 32 of the air-conditioning case 12 has a substantially symmetrical shape about the air flow direction DRa but possibly has a shape different from such a symmetrical shape. For example, the holder possibly has only one side of the first and second ribs 34, 35, and 36 on the leeward side and the first and second ribs 38, 39, and 40 on the windward side.

(5) In the above embodiment, as illustrated in FIG. 3, the second ribs 35, 36, 39, and 40 of the first header tank 16 are divided into the four second rib groups each provided in the corresponding one of the separated spaces 22b, 22c, 23b, and 23c, but this is only an example. Any of the four second rib groups to which the second ribs 35, 36, 39, and 40 belong may be absent, for example.

(6) In the above embodiment, the holder for the second header tank 18 is similar to the holder 32 for the first header tank 16 illustrated in FIGS. 3 to 5, but this is only an example. The holder for the second header tank 18 possibly has a different structure from the holder 32 for the first header tank 16.

The present disclosure is not limited to the above embodiments but includes various modified examples and modifications within the range of equivalents. Moreover, it goes without saying that the components included in the above embodiments are not necessarily required unless specified as being required, regarded as being clearly required in principle, or the like.

The numerical value such as the number, the numerical value, the quantity, the range, or the like of a component mentioned in the above embodiments is not limited to a specific number unless specified as being required, clearly limited to such a specific number in principle, or the like. The material, the shape, the positional relationship, and the like of a component or the like mentioned in the above embodiments are not limited to those being mentioned unless otherwise specified, limited to specific material, shape, positional relationship, and the like in principle, or the like.

Overview

According to a first aspect shown by a whole or part of the above-described embodiments, the holder includes a first rib and a plurality of second ribs, and the first and second ribs press the tank outer wall toward the internal space. The first rib extends in the tube stacking direction. The plurality of second ribs are each connected to the first rib, are formed to extend from the first rib away from the tubes, and are arranged side by side at a predetermined inter-rib spacing in the tube stacking direction. The inter-rib spacing is larger than a length of the second ribs extending from the first rib away from the tubes in the tube longitudinal direction.

According to a second aspect, the plurality of second ribs is provided between one end and another end of the tank space in the tube stacking direction, the plurality of second ribs is disposed such that a range occupied by the plurality of second ribs in the tube stacking direction overlaps a center position of the tank space in the tube stacking direction, and the plurality of second ribs presses a portion of the tank outer wall covering the tank space. The vibration of the tank outer walls can thus be suppressed by pressing the tank outer walls at the site prone to vibration.

According to a third aspect, the header tank includes a partition plate that forms a plurality of separated spaces by partitioning the internal space of the header tank in the tube stacking direction. The tank space is provided as one of the plurality of separated spaces. Therefore, even when the internal spaces of the header tank are divided into the plurality of separated spaces, the refrigerant flow noise in the heat exchanger can be reduced by efficiently suppressing the vibration of the header tank.

Comparative Example

A comparative example of a heat exchanger is included in an air-conditioning unit. The heat exchanger of the comparative example has a heat exchanger core including first tubes, second tubes, first corrugated fins, second corrugated fins, and connectors.

A first fluid flows through the first tubes which perform heat exchange between the first fluid and the air. A second fluid flows through the second tubes which perform heat exchange between the second fluid and the air. The passage of each of the first and second tubes has a flat cross section, and the second tubes are disposed upstream of the first tubes along the air flow.

The first corrugated fin is joined to the outer surface of each of the first tubes by brazing or the like at ridges or troughs of the fin. Likewise, the second corrugated fin is joined to the outer surface of each of the second tubes by brazing or the like at ridges or troughs of the fin.

Moreover, the connectors connect the ridges or the troughs of the first and second corrugated fins therebetween. As a result, a decrease in the rigidity of the heat exchanger core and generation of fluid flow noise in the first and second tubes can be suppressed.

While the heat exchanger of the the comparative example can suppress generation of the fluid flow noise in the tubes, a typical heat exchanger includes a header tank to which a plurality of tubes is connected, for example. In the case of such a heat exchanger, the fluid flow noise, that is, refrigerant flow noise, can also be generated from the header tank.

In contrast to the the comparative example, the present disclosure provides an air-conditioning unit that can reduce the refrigerant flow noise by efficiently suppressing vibration of a header tank.

According to an aspect of the present disclosure, an air-conditioning unit includes: an air-conditioning case in which an air passage is formed, the air passage allowing air to flow through the air passage; and a heat exchanger disposed in the air passage and configured to perform heat exchange between a refrigerant and the air flowing through the air passage. The heat exchanger includes a plurality of tubes stacked in a tube stacking direction, extending in a tube longitudinal direction, and allowing the refrigerant to flow through the tubes, and a header tank formed to extend in the tube stacking direction and connected to one end of each of the plurality of tubes. The header tank includes a tank outer wall that separates an internal space of the header tank from the outside of the header tank and extends in the tube stacking direction. The air-conditioning case includes a holder in which the header tank is held while being inserted in the holder. The holder includes a first rib and a plurality of second ribs, the first and second ribs pressing the tank outer wall toward the internal space. The first rib extends in the tube stacking direction. The plurality of second ribs are each connected to the first rib, are formed to extend from the first rib away from the tubes, and are arranged side by side at a predetermined inter-rib spacing in the tube stacking direction. The inter-rib spacing is larger than a length of the second ribs extending from the first rib away from the tubes in the tube longitudinal direction.

The first rib and the second ribs are provided in the holder of the air-conditioning case in the above manner so that, in terms of suppressing vibration of the header tank, the amplitude of vibration of the tank outer wall when the header tank vibrates can be properly suppressed by the first rib and the second ribs. In short, the vibration of the header tank can be efficiently suppressed. As a result, the refrigerant flow noise generated from the heat exchanger can be reduced.

The inter-rib spacing is larger than the length of the second rib extending from the first rib away from the tubes in the tube longitudinal direction. Accordingly, the range of the tank outer wall pressed by the second ribs can be expanded in the tube stacking direction while the tank outer wall is pressed by the first and second ribs with a pressing force which is not excessive. As a result, the refrigerant flow noise can be reduced for heat exchangers of various sizes.

What is claimed is:
1. An air-conditioning unit comprising:
an air-conditioning case in which an air passage is formed, the air passage allowing air to flow through the air passage; and
a heat exchanger disposed in the air passage and configured to perform heat exchange between a refrigerant and the air flowing through the air passage,
wherein:
the heat exchanger includes a plurality of tubes stacked in a tube stacking direction, extending in a tube longitudinal direction, and allowing the refrigerant to flow through the tubes, and a header tank extending in the tube stacking direction and connected to one end of each of the plurality of tubes;
the header tank includes a tank outer wall that separates an internal space of the header tank from the outside of the header tank and extends in the tube stacking direction;
the air-conditioning case includes a holder in which the header tank is held while being inserted in the holder;
the holder includes a first rib and a plurality of second ribs, the first and second ribs pressing the tank outer wall toward the internal space;
the first rib extends in the tube stacking direction;
the plurality of second ribs are each directly connected to and intersect with the first rib, extend from the first rib away from the tubes, and are arranged side by side at a predetermined inter-rib spacing in the tube stacking direction; and the inter-rib spacing is larger than a length of the second ribs extending from the first rib away from the tubes in the tube longitudinal direction.

2. The air-conditioning unit according to claim 1, wherein the internal space of the header tank includes a tank space as a space that communicates with at least one of the plurality of tubes and extends in the tube stacking direction, and the plurality of second ribs is provided between one end and another end of the tank space in the tube stacking direction, the plurality of second ribs is disposed such that a range occupied by the plurality of second ribs in the tube stacking direction overlaps a center position of the tank space in the tube stacking direction, and the plurality of second ribs presses a portion of the tank outer wall covering the tank space.

3. The air-conditioning unit according to claim 2, wherein the header tank includes a partition plate that forms a plurality of separated spaces by partitioning the internal space of the header tank in the tube stacking direction, and the tank space is provided as one of the plurality of separated spaces.

4. The air-conditioning unit according to claim 3, wherein the header tank includes a first header and a second header which are arranged in a direction orthogonal to the tube stacking direction and the tube longitudinal direction, the first rib is one of a pair of first ribs pressing the first header and the second header, respectively, from opposite sides, the partition plate includes a first partition plate partitioning an internal space of the first header, and a second partition plate partitioning an internal space of the second header, and the first partition plate and the second partition plate are offset relative to each other in the tube stacking direction such that a range of the plurality of second ribs directly connected to one of the pair of first ribs are offset relative to a range of the plurality of second ribs directly connected to the other of the pair of first ribs.

5. The air-conditioning unit according to claim 1, wherein a first plurality of second ribs located on a first side of the holder is offset from a second plurality of second ribs located on a second side of the holder, the first side of the holder being opposite from the second side of the holder.

* * * * *